United States Patent [19]
Shiraishi

[11] Patent Number: 5,032,996
[45] Date of Patent: Jul. 16, 1991

[54] APPARATUS AND METHOD FOR DETECTING NEUTRAL STEERING ANGLE OF STEERING WHEEL SYSTEM FOR VEHICLE

[75] Inventor: Yasuhiro Shiraishi, Kanagawa, Japan

[73] Assignee: Nissan Motor Company, Limited, Japan

[21] Appl. No.: 408,252

[22] Filed: Sep. 18, 1989

[30] Foreign Application Priority Data

Sep. 16, 1988 [JP] Japan .................. 63-230134

[51] Int. Cl.⁵ .............................................. B62D 6/00
[52] U.S. Cl. .................. 364/424.05; 180/79.1; 180/140
[58] Field of Search ............ 364/424.05; 180/140, 180/79.1; 280/91, 99

[56] References Cited

U.S. PATENT DOCUMENTS

| | | | |
|---|---|---|---|
| 4,794,536 | 12/1988 | Eto et al. | 364/424.05 |
| 4,803,629 | 2/1989 | Noto et al. | 364/424.05 |
| 4,869,335 | 9/1989 | Takahashi | 180/79.1 |

FOREIGN PATENT DOCUMENTS

63-219306 9/1987 Japan .

Primary Examiner—Gary Chin
Attorney, Agent, or Firm—Lowe, Price, LeBlanc & Becker

[57] ABSTRACT

An apparatus and - method for detecting a neutral steering angle of a steering wheel of a vehicle through which the vehicle runs straight in which when a neutral proximity signal is outputted which indicates that a steering angle of the steering wheel falls in a predetermined angular range placed in a proximity to the neutral steering angle, a deviation quantity (angle value) between the steering angle received from a steering angle sensor at a time when the neutral proximity signal is outputted and neutral steering angle is derived, updated, and stored as a final value irrespective of an on and off position of a vehicular ignition switch. In addition, when the neutral proximity steering angle is received at a first time when the ignition switch has been turned on, the neutral steering angle is reproduced from the steering angle at that time and the final value of the deviation quantity.

16 Claims, 6 Drawing Sheets

FIG. 2
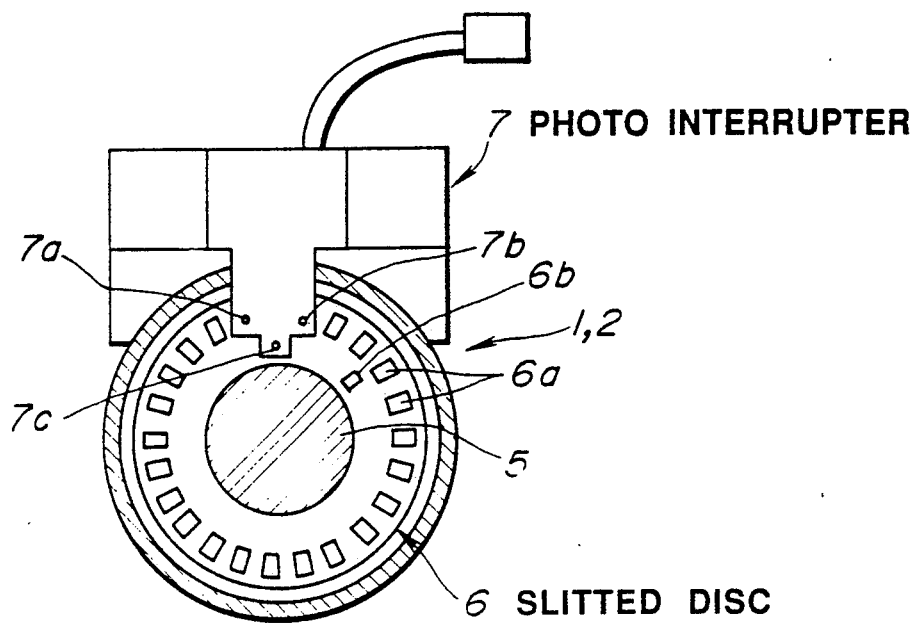
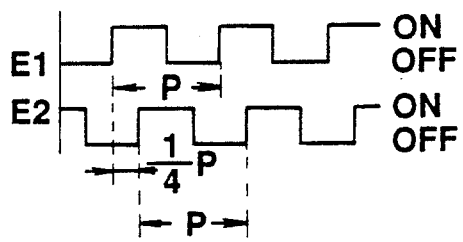
FIG. 3 (a)
(CLOCKWISE STEERING)
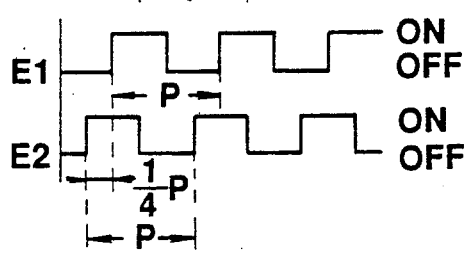
FIG. 3 (b)
(COUNTERCLOCKWISE STEERING)
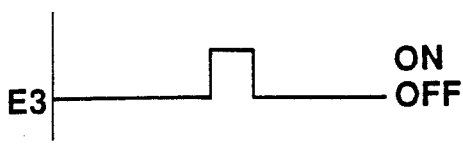
FIG. 3 (c)

APPARATUS AND METHOD FOR DETECTING NEUTRAL STEERING ANGLE OF STEERING WHEEL SYSTEM FOR VEHICLE

BACKGROUND OF THE INVENTION

1. Field of the Invention

The present invention relates generally to an apparatus and method for detecting a neutral steering angle of a steering wheel system for a vehicle, the neutral steering angle thereof being defined as a steering angle at which the vehicle goes straight, and particularly relates to the apparatus and method for detecting the neutral steering angle for a short period of time immediately after the vehicle has traveled.

2. Background of the Art

A detection of a neutral steering angle is indispensable for a control of a four wheel steering carried out during a turn of the running vehicle.

A Japanese Patent Application First Publication Showa 62-201306 published on Sept. 5, 1987 exemplifies a previously proposed neutral steering angle detecting apparatus.

The previously proposed neutral steering angle detecting system includes a microcomputer for receiving a first pulse signal outputted by a steering angle sensor according to a steering angle of a steering wheel and a second pulse signal outputted by a vehicle speed sensor according to a vehicle speed. The microcomputer derives a relative steering angle to a steering position of the steering wheel on the basis of the first output signal when an ignition switch of the vehicle is turned on and derives a running distance of the vehicle from the second output signal of the vehicle speed sensor. The microcomputer derives an average value and variation width of the steering wheel sampled at a regular interval during the run of the vehicle whenever the vehicle has run at a predetermined reference distance. In a case where the variation width falls within a predetermined reference value, the microcomputer determines that the average value derived together with the variation width is the neutral steering angle. According to the previously proposed apparatus, since the variation width of the steering wheel is narrow and the microcomputer determines only the average value of the steering angle in a case where a possibility of running on a straight line is extremely high as the neutral steering angle, the neutral steering angle can always accurately be detected in cases where the turn in the same direction is repeated or where the steering angle is largely deviated from the neutral angle when the ignition switch is turned on.

However, the above-described neutral steering angle detecting apparatus cannot determine the average value of the steering wheel as the neutral steering angle when the vehicle does not run straight more than the predetermined distance after the ignition switch is turned on. Therefore, when the ignition switch is turned off and the neutral steering angle detected heretofore disappears, the neutral steering angle is newly updated whenever the ignition switch is turned on. Therefore, a detection accuracy cannot be improved by an accumulation of the detected data.

SUMMARY OF THE INVENTION

It is therefore an object of the present invention to provide an apparatus and method for detecting a neutral steering angle of a steering wheel for a vehicle which achieve a high accuracy of detection of the neutral steering angle.

The above-described object can be achieved by providing an apparatus for a vehicle, comprising: a) first means for detecting a steering angle; b) second means for measuring a running distance of the vehicle; c) third means for comparing the running distance with a previously set reference distance and outputting a running signal whenever the vehicle has run by the reference distance; d) fourth means for deriving an average value of the steering angle during the run whenever the vehicle has run by the reference distance; e) fifth means for calculating a variation width of the steering angle during the run whenever the vehicle has run by a reference distance; f) sixth means for determining the average value derived together with the variation width as a neutral steering angle range in a case where the variation width falls within the reference width; g) seventh means for detecting that the steering angle range has fallen in a predetermined steering angle previously set in the vicinity to the neutral steering angle and outputting a neutral proximity signal upon the detection thereby; h) eighth means for calculating a deviation quantity between the steering angle and the neutral steering angle; i) ninth means for storing the final value of the deviation quantity irrespective of the on and off position of an ignition switch of the vehicle; and j) tenth means for reproducing the neutral steering angle between the final value of the deviation quantity which has been stored and the steering angle the first neutral proximity signal following the ignition switch of the vehicle being turned on.

The above-described object can also be achieved by providing an apparatus for detecting a neutral steering angle of a steering wheel of a vehicle applicable to a four wheel steering control system, comprising: a) first means for detecting a steering angle of the steering wheel; b) second means for detecting a vehicle speed and measuring a running distance of the vehicle on the basis of the vehicle speed; c) third means for comparing the running distance with a previously set reference distance and outputting a running signal whenever the vehicle has run by the reference distance; d) fourth means for deriving an average value of the steering angle during the run whenever the vehicle has run by the reference distance; e) fifth means for calculating a variation width of the steering angle during the run whenever the vehicle has run by a reference distance; f) sixth means for determining the average value derived together with the variation width as the neutral steering angle range through which the vehicle goes straight in a case where the variation width falls within the reference width; g) seventh means for detecting that the steering angle has fallen in a predetermined steering angle range previously set in the vicinity to the neutral steering angle and outputting a neutral proximity signal upon the detection thereby; h) eighth means for calculating a deviation quantity between the steering angle and the neutral steering angle; i) ninth means for storing the final value of the deviation quantity irrespective of the on and off position of an ignition switch of the vehicle; and j) tenth means for reproducing the neutral steering angle between the final value of the deviation quantity which has been stored and the steering angle the first neutral proximity signal following the ignition switch of the vehicle being turned on.

The above-described object can also be achieved by providing a method for detecting a neutral steering angle of a steering wheel of a vehicle applicable to a four wheel steering control system, comprising the steps of: a) detecting a steering angle of the steering wheel; b) measuring a running distance of the vehicle; c) comparing the running distance with a previously set reference distance and outputting a running signal whenever the vehicle has run by the reference distance; d) deriving an average value of the steering angle during the run whenever the vehicle has run by the reference distance; e) calculating a variation width of the steering angle during the run whenever the vehicle has run by a reference distance; f) determining the average value derived together with the variation width as the neutral steering angle range through which the vehicle goes straight in a case where the variation width falls within the reference width; g) detecting that the steering angle has fallen in a predetermined steering angle range previously set in the vicinity to the neutral steering angle and outputting a neutral proximity signal upon the detection therein; h) calculating a deviation quantity between the steering angle and the neutral steering angle; i) providing a memory for storing the final value of the deviation quantity irrespective of the on and off position of an ignition switch of the vehicle; and j) reproducing the neutral steering angle between the final value of the deviation quantity which has been stored and the steering angle the first neutral proximity signal following the ignition switch of the vehicle being turned on.

BRIEF DESCRIPTION OF THE DRAWINGS

FIG. 2 is a front view of a steering sensor and a neutral proximity sensor in the preferred embodiment shown in FIG. 1 according to the present invention.

FIGS. 3(a) through 3(c) are waveform charts of output signals of the steering angle sensor and neutral proximity sensor.

DETAILED DESCRIPTION OF THE PREFERRED EMBODIMENTS

Reference will hereinafter be made to the drawings in order to facilitate a better understanding of the present invention.

Figure 1:
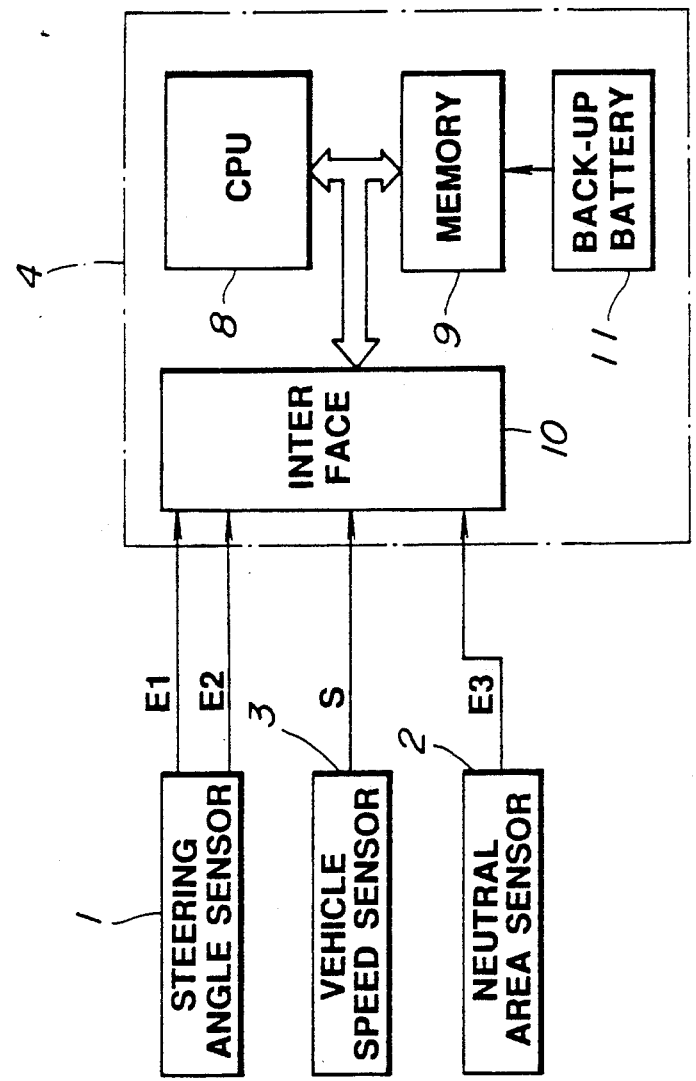
FIG. 1 is a schematic circuit block diagram of a preferred embodiment of a neutral steering angle detecting apparatus for a vehicle according to the present invention.

FIG. 1 shows a preferred embodiment of a neutral steering angle detecting apparatus according to the present invention.

In FIG. 1, a steering angle sensor 1, a vehicle speed sensor 3, and a neutral area sensor 2 are connected to a microcomputer 4.

The microcomputer 4 includes a CPU 8, a memory 9, an input/output interface 10, and a back-up memory 11.

The steering angle sensor 1 and neutral proximity steering angle 2 are integrally fitted to a steering shaft 5 as shown in FIG. 2. A slitted disc plate 6 is integrally rotatable with the steering shaft 5. A photo interrupter 7 is fitted to the slitted disc plate 6 and spaced apart therefrom.

The slitted disc plate 6 includes a multiple number of steering angle measuring slits 6a aligned along a peripheral edge of an outer periphery thereof, and a single slit 6b installed for detecting a position at which the photo interrupter 7 overlaps therewith in a case when the steering wheel mounted onto the steering shaft 5 is placed in proximity to the neutral steering angle. In addition, the photo interrupter 7 includes two steering angle measuring light receiving elements 7a, 7b arranged on positions in a radial direction of the slitted disc plate 6 on which the slit 6a is overlapped so as to be spaced apart from each other by a distance which corresponds to an integral number of times of a pitch p of such a slit 6a added or subtracted by $\frac{1}{4}$ pitch, a single neutral proximity light receiving element 7c arranged on a position in the radial direction on which it is overlapped with the slit 6b, and a light source (not shown) opposed so as to sandwich the slit disc plate 6 with these light receiving elements 7a, 7b, and 7c. When the steering wheel (not shown) is steered which is connected to the steering shaft 5, the slit 6a is moved between the light receiving elements 7a, 7b and light source on the basis of the slitted disc plate 6 (steering shaft 5). Since two kinds of steering angle pulse signals E1, E2 are outputted having two different phase deviations according to the direction along which the steering wheel is steered as shown in FIGS. 3(a) and 3(b) from the light receiving elements 7a, 7b, the light source opposing the steering angle measuring slit 6a and steering angle measuring light receiving elements 7a, 7b is functioned as the steering angle sensor 1.

In addition, when the steering wheel is steered, the slit 6b is rotated between the light receiving element 7c and light source on the basis of the rotation of the slitted disc plate 6.

When the steering angle, thereby, reaches a predetermined angle which is specified with a slit 6b placed in the vicinity to the neutral steering angle, the neutral proximity pulse signal E3 as shown in FIG. 4(c) is outputted from the light receiving element 7c. Therefore, the neutral proximity detecting slit 6b and neutral proximity detecting light receiving element 7c the light source opposing the neutral proximity detecting slit 7c function as a neutral proximity sensor 2.

The vehicle speed sensor 3 includes a magnet connected to a vehicle's speedometer cable and rotatable integrally to the speedometer and a lead switch fixed to the vehicle body and placed in the vicinity to the magnet. The vehicle speed pulse signal S whose number corresponds to the running distance on the basis of the rotation of magnet in response to the run of the vehicle.

The microcomputer 4 includes a Central Processing Unit (CPU) 8, a Memory 9 having a Read Only Memory (ROM) and Random Access Memory (RAM), an interface 10 carrying out input/output of signals, and a back up battery 11 for preventing the disappearance of the memory contents. The back up battery 11 maintaines a part of the RAM in the memory 9 in a valid state even though the vehicle ignition switch is turned off.

Figure 6:
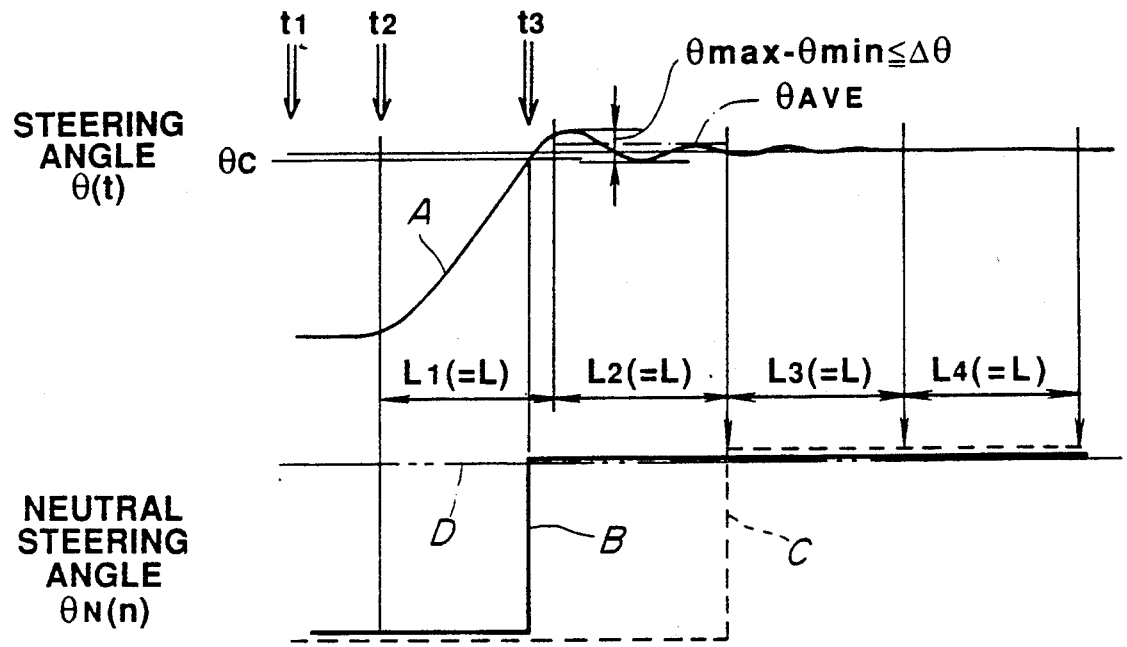
FIG. 6 is a timing chart of an operating state of the preferred embodiment shown in FIG. 1.

The microcomputer 4 receives the power supply when the ignition switch is turned on and inputs the steering angle signals E1 and E2 and neutral proximity signal E3, and vehicle speed signal S via the interface 10. When calculation processing programs shown in FIGS. 4 and 6 are executed in the ROM of the memory 9, the neutral steering angle $\theta_N(n)$ is derived (provided that n denotes a positive integral number incremented whenever $\theta_N$ is derived).

Figure 4:
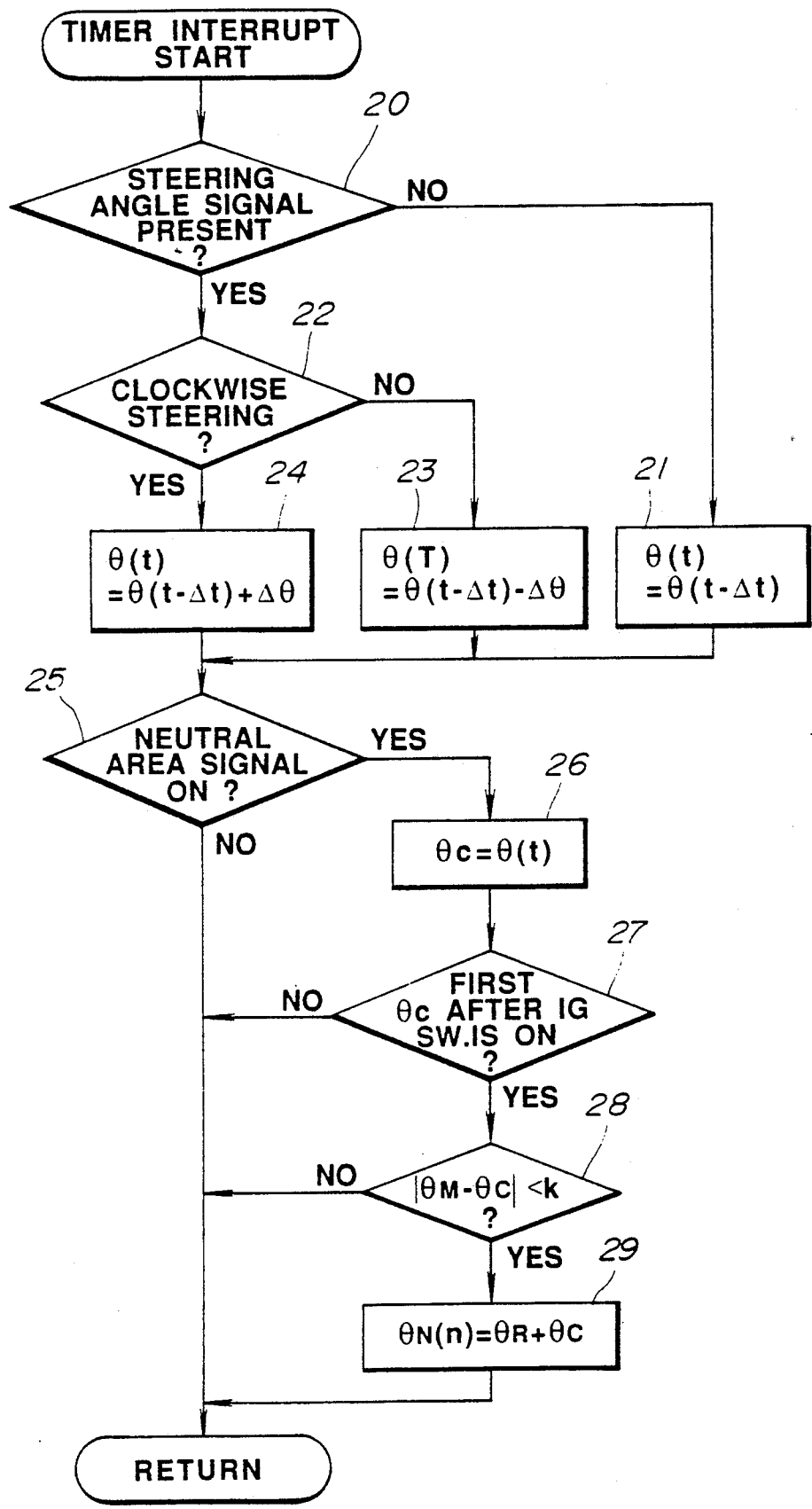
FIG. 4 is a flowchart of a program executed by a microcomputer shown in FIG. 1.

FIG. 4 shows a program for detecting the steering angle and reproducing the neutral steering angle which is executed whenever it is interrupted by a timer for each predetermined interval $\Delta t$ which is sufficiently short as compared with a shortest possible steering speed.

In a step 20, the CPU determines whether the microcomputer 4 receives the inputs of the steering angle signals E1 and E2. In a step 21, the routine goes to a step 21 when no steering angle signal is received. In the step 21, the steering angle $\theta(t-\Delta t)$ derived when the program is previously executed (it is noted that when the program shown in FIG. 4 is initially executed, the steering angle indicates an appropriate value) is set as a present steering angle $\theta(t)$.

In a step 22, the microcomputer 4 determines whether the steering angle direction is deviated from a clockwise direction with respect to the direction of phase deviations of these steering angle signals E1 and E2. If the steering direction is not the clockwise direction, i.e., anticlockwise direction, the routine goes to a step 23. In the step 23, the CPU subtracts the steering angle $\Delta\theta$ of one pitch of the slit 6a from the previously derived steering angle $\theta(t-\Delta t)$ in the old step 23. On the other hand, in a case where the steering wheel is rotated in the clockwise direction, the present steering angle $\theta(t)$ is set with the above-described steering angle $\Delta\theta$ added to the steering angle $\theta(t-\Delta t)$ previously derived in the step 24 when the clockwise steering direction is carried out.

The data on the steering angle $\theta(t)$ derived as described above is written into the RAM of the memory 9.

In the step 25, the CPU determines whether the neutral proximity signal E3 is turned on. If it is not turned on, the present program routine is ended. That is to say, if the steering angle $\theta(t)$ indicates the predetermined angle in the vicinity to the neutral steering angle, the present steering angle $\theta(t)$ is set as the neutral proximity steering angle $\theta c$ in the step 26. The value of $\theta c$ is written into the RAM of the memory 9.

In the next step 27, the CPU determines whether the neutral proximity steering angle $\theta c$ derived in the step 26 indicates a first value since the ignition switch has been turned on. If it indicates the first value, the CPU reads the final memory value $\theta_M$ of the neutral steering angle $\theta_N(n)$ when the ignition switch has previously been turned on. The CPU determines whether an absolute value of a difference between the neutral steering angle stored value $\theta_M$ and neutral proximity steering angle $\theta c$ derived in the step 26 is less than a predetermined value $k(|\theta_M-\theta_C|<k)$.

It is noted that the determination in the step 28 is prepared on a fail safe structure base to prevent erroneous determination of the neutral steering angle $\theta_N(n)$ from a deviation quantity memory value $\theta_R$ in a case where because the steering wheel has been steered during the off state of the ignition switch or a regular inspection of the vehicle has been carried out, the relative positional relationship between the neutral steering angle memory value $\theta_M$ and neutral proximity steering angle $\theta_C$ is varied and a deviation quantity memory value $\theta_R$ (as will be described later) becomes unreliable. Although a case exists where the absolute difference between $\theta_M$ and $\theta_c$ should be less than a predetermined value k which is by nature small to some degree, such a case exists where the absolute difference is not less than the predetermined value k.

In the latter case, the CPU determines that there is a change in the relative positional relationship between $\theta_M$ and $\theta_C$. At this time, The CPU ends the present program routine. In the former case, the CPU determines that the deviation quantity memory value $\theta_R$ is reliable and goes to a step 29.

In the step 29, the CPU reads the final memory value $\theta_R$ of the deviation quantity $\theta_{NR}$ ($\theta_{Nr}=\theta_N(n)-\theta_C$) between the neutral steering angle $\theta_N$ and neutral proximity steering angle $\theta_C$ when the ignition switch was previously turned on. The final memory value $\theta_R$ is held during the switch being turned off from the RAM of the memory 9. The neutral proximity steering angle $\theta_c$ derived in the step 26 is added to the deviation quantity memory value $\theta_R$ in order to reproduce the neutral steering angle $\theta_N$ ($\theta_N=\theta_R+\theta_C$). Thereafter, the program is ended.

Figure 5:
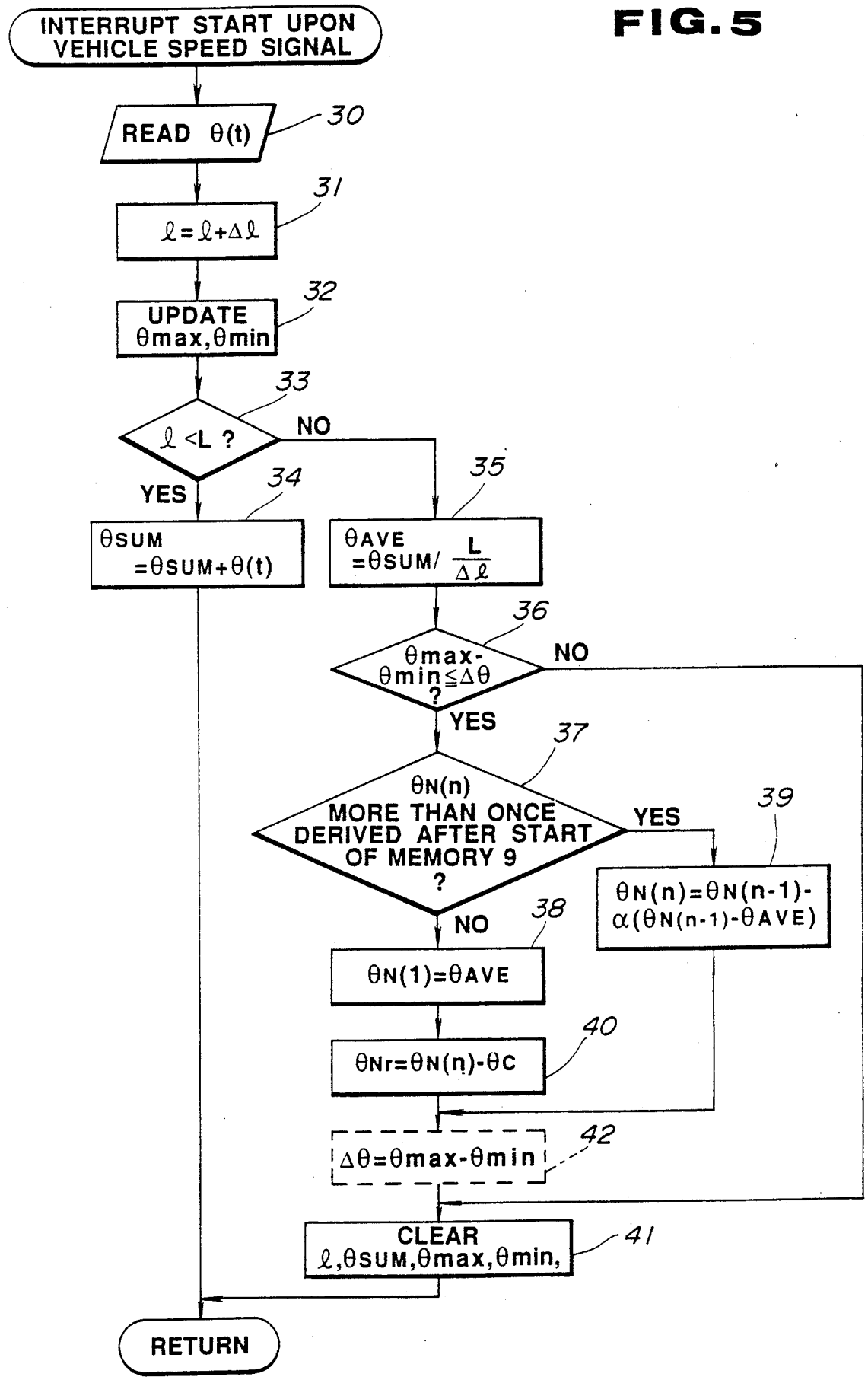
FIG. 5 is a flowchart of another program executed by the microcomputer shown in FIG. 1.

FIG. 5 shows a program routine for detecting the neutral steering angle executed in response to an interrupt command, i.e., executed whenever the vehicle speed pulse signal S from the vehicle speed sensor is turned on (the vehicle has run by a predetermined distance ($\Delta l$). In a step 30, the CPU reads the previously detected steering angle $\theta_t$ written within the RAM. Hence, the steering angle $\theta_t$ read in the step 30 indicates the data extracted whenever the vehicle has run at a constant distance $\Delta l$.

In a step 31, the CPU adds the above-described predetermined distance $\Delta l$ to the counter 1 measuring the running distance. In a step 32, the CPU compares the value of the steering angle $\theta_t$ read in the step 30 maximum value $\theta_{max}$ and minimum value $\theta_{min}$ stored in the RAM. If the value of $\theta_t$ is larger than the value $\theta_{max}$, the CPU updates the value of $\theta_{max}$. If the value of $\theta(t)$ is less than $\theta_{min}$, the CPU updates the value of $\theta_{min}$, respectively.

In the step 33, the CPU determines whether the running distance 1 is smaller than the previously set reference distance L ($l<L$). If $l<L$, the routine goes to a step 34. After the previous $\theta_t$ is added to the sum $\theta_{SUM}$ of the steering angle in the step 34, if $l<L$. the program is ended. If not $l<L$, i.e., the vehicle has run by the reference distance L, the routine goes to a step 35. In the step 35, the value of $\theta_{SUM}$ which is a total sum of the steering angle during the run of the vehicle is divided by the data number of the steering angle (L/$\Delta l$) to calculate an average value of the steering angle $\theta_{AVE}$.

$$(\theta_{AVE}=\theta_{SUM}/L/\Delta l).$$

Thereafter, in a step 36, the CPU calculates a difference between the maximum value $\theta_{max}$ and minimum value $\theta_{min}$ of the steering angle during the run of the reference distance L so as to derive a variation width. The CPU determines whether its variation width falls within the reference width $\theta$.

The determination of the step 36 is carried out to derive the neutral steering angle $\theta_N(n)$ from the data of the steering angle $\theta_t$ measured during the run only if the probability that the run during the reference distance L is extremely high. If the variation width falls within the reference width $\theta(\theta_{max}-\theta_{min}\leq\Delta\theta)$ previously set as a range to adjust the steering angle in order to maintain the running road usually when the vehicle runs straight.

The routine goes to a step 37 when the CPU determines that the probability that the run by the reference distance L was straight is extremely high.

In a step 37, the CPU determines that the neutral steering angle $\theta_N(n)$ was derived more than once after the operation start of the memory 9. In the case of the first time, the routine goes to a step 38. On the other hand, the average value $\theta_{AVE}$ of the steering angle derived in the step 35 is set as the neutral steering angle $\theta_N(1)$. The routine goes to a step 39 in a case where the average value $\theta_{AVE}$ is already derived more than once. The CPU derives the neutral steering angle $\theta_N(n)$ from a weight mean, a constant $\alpha$ (provided, $0 \leq \alpha \leq 1$) being set as a weight coefficient $(\theta_N(n) = \theta_N(n-1) - \alpha(\theta_N - \alpha(\theta_N(n-1) - \theta_{(n-1)} - \theta_{AVE})$.

It is noted that since a part of the RAM of the memory continues to operate even after the ignition switch is turned off, the above-described step 38 is executed only immediately after the vehicle in which the neutral steering position detecting apparatus according to the present invention has been installed and only when the CPU executes all of the contents of the RAM of the memory 9 has disappeared due to the life of the back up battery 11.

In the next step 40, the deviation quantity $\theta_{Nr}$ is derived by subtracting the neutral proximity steering angle $\theta_C$ read within the RAM of the memory 9 from the neutral steering angle $\theta_N(n)$ derived in the step 38 or step 39 $(\theta_{Nr} = \theta_N(n) - \theta_C)$. The derived deviation quantity $\theta_{Nr}$ is updated with the value of $\theta_R$ written during the previous execution of the program as the memory value $\theta_R$ and is written within the RAM to which the back up battery 11 is connected in the step 38, or in the step 39.

Furthermore, in the step 40, the CPU replaces the neutral steering angle $\theta_N$ derived in the step 38, or step 39 with the previously written value of $\theta_M$ as the memory value $\theta_M$ within the RAM to which the back up battery 11 is connected in order to be used for the processing in the previously mentioned step 28. Hence, when the ignition switch is turned off and the final values of both the deviation quantity $\theta_{Nr}$ and neutral steering angle $\theta_N$ derived during the previous on state, the CPU is held within the RAM as the memory value $\theta_R$ and memory value $\theta_M$.

On the other hand, if the variation width as the result of determination in the step 36 falls within the reference width $\Delta\theta$, the CPU does not derive the neutral steering angle $\theta_N$ and skips the steps 37 through 40 described above since the probability that the run of the reference distance L was a turning run in cases where the variation width does not fall within the reference width $\Delta\theta$ is extremely high.

In the step 41, then, all of the values of l, $l_{SUN}$, $\theta_{max}$, and $\theta_{min}$ are cleared in order to prepare the calculation processing of the steering angle data during the run of the subsequent reference distance L. Thereafter, this program is ended.

It is noted that, as shown by a broken line in FIG. 5, a new step 42 is inserted between the steps 40 and 41. In the step 42, the reference width $\theta$ may be updated with the value of the variation width $(\theta_{max} - \theta_{min})$ derived in the step 36 used to update the reference width $\theta$. In this way, since by repeating the determination of the step 36 the variation width, i.e., the reference width $\Delta\theta$ becomes gradually narrower corresponding to the actual steering situation, the detection accuracy of the neutral steering angle becomes improved as the total running distance becomes longer.

FIG. 6 shows characteristic graphs of change patterns of the steering angle $\theta(t)$ and the neutral steering angle $\theta_N(n)$ immediately after the ignition switch has been turned on, as a specific example of the operating state of the above-described state.

In FIG. 6, a solid line A denotes the change pattern of the neutral steering angle $\theta_t$ immediately after the ignition switch has been turned on, a solid line B denotes the change pattern of the neutral steering angle $\theta_N$ in the preferred embodiment, and a solid line C denotes the change pattern of the neutral steering angle in the previously proposed apparatus. In addition, a dot-dot,- and dash line D denotes a real steering angle.

As shown in FIG. 6, suppose that the ignition switch is turned on at a time $t_1$ and that the vehicle has started the run of the vehicle at a time $t_2$. Since in the case of the previously proposed apparatus, the average value $\theta_{AVE}$ of an interval $L_2$ at which the vehicle has run is set as the neutral steering angle $\theta_N(n)$, it takes time to derive the value of the neutral steering angle $\theta_N(n)$ although the value of the neutral steering angle itself is accurate.

On the other hand, since, in the first preferred embodiment described above, the instantaneous steering angle $\theta_{(t)}$ is set as the neutral proximity steering angle $\theta_C$ at a time $t_3$ at which the steering angle becomes a predetermined angle placed in the vicinity to the neutral angle range $\theta_N(n)$ and the neutral steering angle $\theta_N$ is reproduced from the value $\theta_c$ and the stored deviation quantity $\theta_R$. Therefore, the value of the neutral steering angle $\theta_N(n)$ is accurate and the neutral steering angle $\theta_N(n)$ is speedily derived when the steering angle becomes in the proximity to the neutral position.

Since in the first preferred embodiment the reference width $\theta$ is narrowed as the running distance becomes long. Thus, the neutral steering angle at which the accuracy becomes higher is used after the ignition switch has again turned on. The accumulation of the data can improve the detection accuracy of the neutral steering angle.

A second preferred embodiment of the neutral steering angle detecting apparatus according to the present invention will be described.

Figure 7:
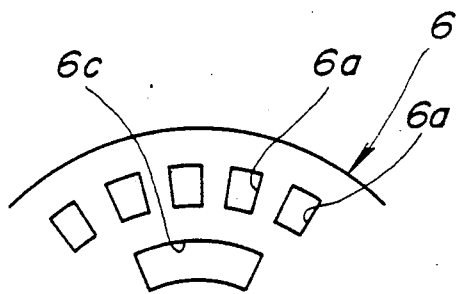
FIG. 7 is a front view of an essential part of the neutral proximity sensor in another preferred embodiment according to the present invention.

In the preferred embodiment, as shown in FIG. 7, the neutral proximity detecting slit 6c is installed having a relatively wide width such that the neutral proximity detecting light receiving element 7c is inserted in the slitted disc plate 6 described in the first preferred embodiment between both end edges in the peripheral direction of the slit at the neutral steering angle in place of the neutral proximity detecting slit 6b. The steering angles $\theta(t)$ at both end edges of the slit 6c are set as the neutral proximity steering angles $\theta_a$ and $\theta_b$. The deviation quantity between these $\theta_a$ and $\theta_b$ and the neutral steering angle $\theta_N(n)$ is stored in the RAM and stored during the turning off of the ignition switch.

Figure 8:
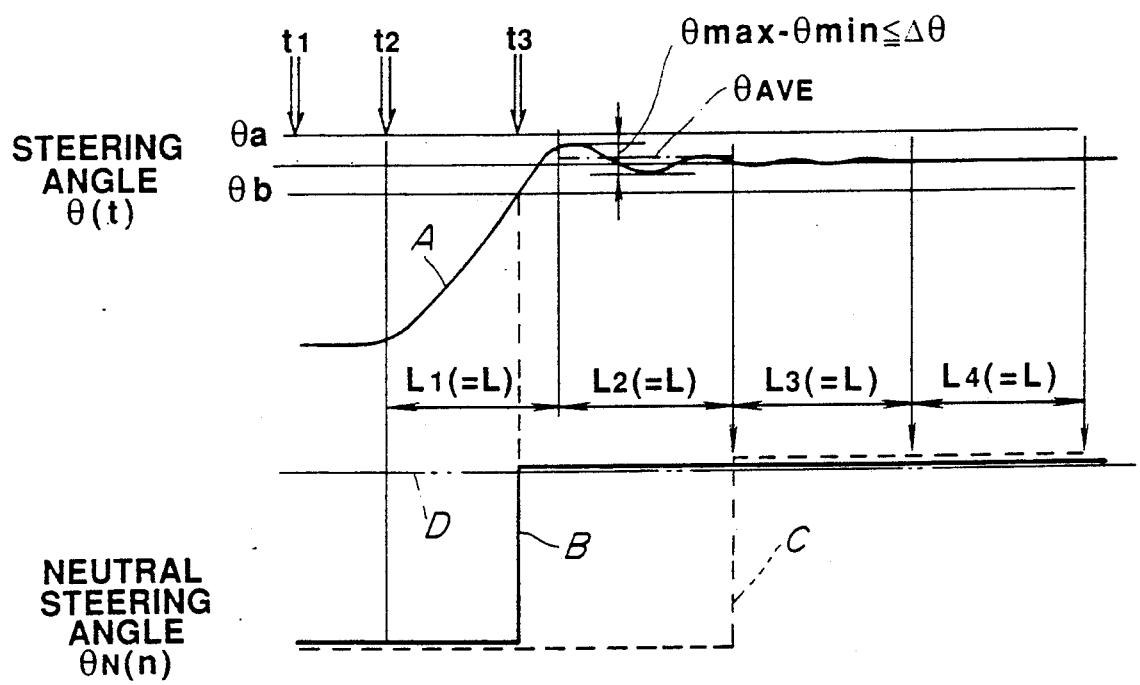
FIG. 8 is a timing chart of an operating state of the other preferred embodiment shown in FIG. 7.

FIG. 8 shows characteristic graphs of the change patterns of the operations of the above-described apparatus. In FIG. 8, the same reference numerals denote the corresponding elements.

As shown in FIG. 8, in the first preferred embodiment, the neutral proximity steering angle $\theta_N(n)$ is reproduced at a time $t_3$ at which the steering angle indicates the neutral proximity steering angle $\theta_a$ or $\theta_b$ largely remote from the neutral steering angle than that in the first preferred embodiment. Therefore, at a time when the ignition switch has been turned on, e.g., at a time when the ignition switch has been turned on, the steering wheel is steered to some degree by means of, e.g., a steering lock mechanism at a time when the ignition switch has been turned on. However, when the vehicle has run after the ignition switch has been turned on and the steering angle is returned toward the neutral steering angle, the neutral steering angle can be derived at an earlier than the first preferred embodiment. In the first preferred embodiment, the effect that the neutral steering angle can be derived at an earlier stage even when the steering angle is returned to the neutral steering angle from either of both left and right directions.

In the neutral steering angle detecting apparatus according to the present invention, e.g., the neutral proximity sensor may be installed independently of the steering angle sensor. In addition, the back up power supply for the memory may directly be received from the vehicle battery in place of via the ignition switch.

As described hereinabove, in the neutral steering angle detecting apparatus according to the present invention, the final value of the deviation quantity between the predetermined steering angle in the vicinity to the neutral steering angle and the neutral steering angle is stored during the turning off of the ignition switch. After the ignition switch has been turned on, the steering angle initially reaches the predetermined steering angle. At this time, the neutral steering angle is reproduced from the steering angle at that time and from the final value of the above-described deviation quantity. The neutral steering angle is detected for an extremely short time. Furthermore, the neutral steering angle data can be used before the ignition switch has been turned off so that the detection accuracy by the accumulation of the data can be improved.

It will fully be appreciated by those skilled in the art that the foregoing description is made in terms of the preferred embodiments and various changes and modifications may be made without departing from the scope of the present invention which is to be defined by the appended claims.

What is claimed is:

1. An apparatus for a vehicle, comprising:
   a) first means for detecting a steering angle;
   b) second means for measuring a running distance of the vehicle;
   c) third means for comparing the running distance with a previously set reference distance and outputting a running signal whenever the vehicle has reached the reference distance;
   d) fourth means for deriving an average value of the steering angle during the run whenever the vehicle has reached the reference distance;
   e) fifth means for calculating a variation width of the steering angle during the run whenever the vehicle has reached the reference distance;
   f) sixth means for determining an average value of the calculated variation widths as a neutral steering angle range in a case where the variation width falls within a reference width;
   g) seventh means for detecting that the steering angle has fallen in a predetermined steering angle previously set in the vicinity to the neutral steering angle and outputting a neutral proximity signal upon the detection thereby;
   h) eighth means for calculating a deviation quantity between the steering angle and the neutral steering angle;
   i) ninth means for storing a final value of the deviation quantity irrespective of the on and off of an ignition switch of the vehicle; and
   j) tenth means for reproducing the neutral steering angle from the final value of the deviation quantity which has been stored and the steering angle corresponding to the neutral proximity signal following the ignition switch of the vehicle being turned on.

2. An apparatus as set forth in claim 1, wherein the first means comprises a slitted disc plate integrally rotatable with a steering shaft of the vehicle, the slitted disc plate having a multiple number of slits provided at equal intervals along an outer periphery thereof and a photo interrupter installed adjacent to the slitted disc plate so as to sandwich the slits.

3. An apparatus as set forth in claim 2, wherein the seventh means comprises a single slit penetrated through the slitted disc plate at a position in a radially inner direction of the disc plate which is overlapped with the photo interrupter in a case where the steering wheel is placed in the vicinity of the neutral steering wheel.

4. An apparatus as set forth in claim 3, wherein the photo interrupter includes two first light receiving elements disposed at two positions overlapping with the slits for detecting the steering angle so as to be spaced apart from each other along the peripheral direction of the disc plate by a distance corresponding to an integral number of times of a pitch added or subtracted by ¼ pitch, a second light receiving element disposed so as to be overlapped with the slit disposed in a radially inner direction, and a light source.

5. An apparatus as set forth in claim 1, wherein the second means includes a vehicle speed sensor for detecting the vehicle speed.

6. An apparatus as set forth in claim 1, wherein the first means outputs a steering angle signal indicating the steering angle whenever the vehicle has reached a predetermined distance and wherein the fourth means derives a total sum of the steering angle ($\theta_{SUM}$) when the vehicle has reached the reference distance and deriving the fourth means average value ($\theta_{AVE}$) by dividing the value of the total sum of the steering angles by the number of times the vehicle has reached the reference distance ($L/\Delta l$).

7. An apparatus as set forth in claim 5, wherein the fifth means derives a maximum value ($\theta_{MAX}$) and minimum value ($\theta_{MIN}$) of the detected steering angles during the run of the reference distance (L) and derives a difference between the maximum value and minimum value to calculate the variation width.

8. An apparatus as set forth in claim 6, which further includes eleventh means for determining whether the variation width derived by the fifth means falls within the reference width ($\Delta\theta$).

9. An apparatus as set forth in claim 7, wherein the apparatus comprises a memory which receives a power supply even when the ignition switch is turned off, wherein the sixth means includes twelfth means for determining whether the neutral steering angle has been derived one or more times since the memory has operated and thirteenth means for deriving the neutral steering angle $\theta_N(1)$ from the average steering angle $\theta_{AVE}$ derived by the fourth means when the twelfth means determines that the neutral steering angle has first been derived and deriving the neutral steering angle $\theta_N$ from a weight mean of a previous neutral steering angle $\theta_{(n-1)}$ and the average steering angle $\theta_{AVE}$ with a constant α being a weight coefficient ((provided that $0 \leq \alpha \leq 1$) ($\theta_{(n)} = \theta_N(n-1) - \alpha(\theta_{(n-1)} - \theta_{AVE})$).

10. An apparatus as set forth in claim 8, wherein the tenth means includes fourteenth means for determining whether the neutral proximity signal outputted by the seventh means is the first proximity signal since the ignition switch has been turned on and fifteenth means for determining whether an absolute difference between the values of the neutral steering derived when the ignition switch has previously turned on and the proximity signal is less than a predetermined value k ($|\theta_M - \theta_C| < k$) on the basis of the result of the determination by the fourteenth means.

11. An apparatus as set forth in claim 9, wherein the tenth means reproduces the neutral steering angle from the addition of the final value of the deviation quantity stored by the ninth means and the neutral proximity steering angle signal detected by the seventh means ($\theta_N(n) = \theta_R + \theta_C$).

12. An apparatus as set forth in claim 10, wherein the ninth means is constituted by the memory and which further includes a back up power supply connected to the memory, the previously derived neutral steering angle being stored in the memory as $\theta_M$.

13. An apparatus as set forth in claim 4, wherein a third slit having a width wider that the second slit is provided in place of the second slit so that the second light receiving element can be inserted thereinto.

14. An apparatus as set forth in claim 12, wherein the seventh means outputs the neutral proximity signal when the second light receiving element detects each end edge of the third slit.

15. An apparatus for detecting a neutral steering angle of a steering wheel of a vehicle applicable to a four wheel steering control system, comprising:
   a) first means for detecting a steering angle of the steering wheel;
   b) second means for detecting a vehicle speed and measuring a running distance of the vehicle on the basis of the vehicle speed;
   c) third means for comparing the running distance with a previously set reference distance and outputting a running signal whenever the vehicle has reached the reference distance;
   d) fourth means for deriving an average value of the steering angles during the run whenever the vehicle has reached the reference distance;
   e) fifth means for calculating a variation width of the steering angle during the run whenever the vehicle has reached a reference distance;
   f) sixth means for determining an average value of the calculated variation widths as the neutral steering angle through which the vehicle does straight in a case where the variation width falls within a reference width;
   g) seventh means for detecting that the steering angle has fallen in a predetermined steering angle previously set in the vicinity to the neutral steering angle and outputting a neutral proximity signal upon the detection thereby;
   h) eighth means for calculating a deviation quantity between the steering angle and the neutral steering angle;
   i) ninth means for storing a final value of the deviation quantity irrespective of the on and off position of an ignition switch of the vehicle; and
   j) tenth means for reproducing the neutral steering angle between the final value of the deviation quantity which has been stored and the steering angle on the basis of the neutral proximity signal in a case when the ignition switch of the vehicle has been turned on.

16. A method for detecting a neutral steering angle of a steering wheel of a vehicle applicable to a four wheel steering control system, comprising the steps of:
   a) detecting a steering angle of the steering wheel;
   b) measuring a running distance of the vehicle;
   c) comparing the running distance with a previously set reference distance and outputting a running signal whenever the vehicle has reached the reference distance;
   d) deriving an average value of the steering angles during the run whenever the vehicle has reached the reference distance;
   e) calculating a variation width of the steering angle during the run whenever the vehicle has reached a reference distance;
   f) determining an average value of the calculated variation widths as the neutral steering angle range through which the vehicle goes straight in a case where the variation width falls within a reference width;
   g) detecting that the steering angle has fallen in a predetermined steering angle previously set in the vicinity to the neutral steering angle and outputting a neutral proximity signal upon the detection therein;
   h) calculating a deviation quantity between the steering angle and the neutral steering angle;
   i) providing a memory for storing a final value of the deviation quantity irrespective of the on and off position of an ignition switch of the vehicle; and
   j) reproducing the neutral steering angle between the final value of the deviation quantity which has been stored and the steering angle on the basis of the neutral proximity signal in a case when the ignition switch of the vehicle has been turned on.

* * * * *